US006454832B1

(12) United States Patent
Verdier et al.

(10) Patent No.: US 6,454,832 B1
(45) Date of Patent: *Sep. 24, 2002

(54) ALUMINIUM ALLOY SEMI-FINISHED PRODUCT MANUFACTURING PROCESS USING RECYCLED RAW MATERIALS

(75) Inventors: Jean-Francois Verdier, Issoire (FR); Michel Leroy, St. Egreve (FR); Laurent Calaque, Grenoble (FR)

(73) Assignee: Pechiney Rhenalu, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/709,470

(22) Filed: Nov. 13, 2000

Related U.S. Application Data

(63) Continuation-in-part of application No. 09/479,996, filed on Jan. 10, 2000.

(30) Foreign Application Priority Data

Nov. 15, 1999 (FR) .............................................. 99 14281

(51) Int. Cl.$^7$ ................................................ C22B 21/06
(52) U.S. Cl. .............................. 75/353; 75/672; 75/687
(58) Field of Search ........................... 75/353, 672, 687

(56) References Cited

U.S. PATENT DOCUMENTS

| | | | | |
|---|---|---|---|---|
| 3,630,725 A | * | 12/1971 | Cofer ........................... | 75/687 |
| 4,159,907 A | | 7/1979 | Amino | |
| 4,498,523 A | * | 2/1985 | Bowman et al. .............. | 75/687 |
| 6,293,990 B1 | * | 9/2001 | Verdier et al. ................. | 75/353 |

FOREIGN PATENT DOCUMENTS

| | | |
|---|---|---|
| EP | 0099948 | 2/1984 |
| EP | 0289294 | 11/1988 |
| EP | 0745693 | 12/1996 |
| GB | 2220214 | 1/1990 |

* cited by examiner

*Primary Examiner*—George Wyszomierski
(74) *Attorney, Agent, or Firm*—Dennison, Schultz & Dougherty

(57) ABSTRACT

A manufacturing process for an intermediate product made of a predetermined 7000 series alloy having a target content of at least one first anti-recrystallizing element Z1 selected from the group consisting of Zr and Cr. This process enables effective recycling of scrap, particularly machining scrap made of 7000 series alloys, in the manufacture of intermediated products with high added value. The product is produced by the steps of:

a) supplying scrap, which may be machining scrap, including at least one second 7000 series alloy having a target content of at least one second anti-recrystallizing element Z2 selected from the group consisting of Zr and Cr, in an amount greater than a maximum accepted content of Z2 in the predetermined alloy;

b) conducting at least one refining step of said scrap to reduce the amount of Z2 to a value below the maximum accepted content of Z2 in the predetermined alloy;

c) producing a batch of liquid metal having nominal composition, in part or in whole, from the refined scrap; and d) forming the product by casting the liquid metal.

34 Claims, 2 Drawing Sheets

ALUMINIUM ALLOY SEMI-FINISHED PRODUCT MANUFACTURING PROCESS USING RECYCLED RAW MATERIALS

This application is a continuation-in-part of Ser. No. 09/479,996 filed Jan. 10, 2000.

FIELD OF THE INVENTION

The invention relates to the manufacture of aluminium alloy products and semi-finished products, such as rolling ingots, extrusion billets or sheets, from recycled raw materials, such as machining scrap. The invention particularly relates to the manufacture of products and semi-finished products made of 7000 series alloys according to the Aluminium Association and the European standard EN 573-3 (or any other specification), i.e. Al—Zn—Mg and Al—Zn—Mg—Cu alloys, particularly those intended for the aeronautical industry.

DESCRIPTION OF RELATED ART

In several industries, finished metal product manufacturing processes including such operations as machining, processing, cutting, etc. of intermediate products generate high quantities of machining scrap. In the text below, the term "scrap" refers to the excess material removed from intermediate products during manufacturing processes including such operations as turning, slicing, planing, milling, surfacing, trimming, drilling, tapping, extrusion, sawing, boring or machining finishing operations or similar operations. The term "scrap" refers to both small pieces (or "piecemeal scrap"), such as chips, and larger pieces, such as cutting scrap or cutting outlines of thin or tick sheets, profiles, ingots, billets, etc.

For practical and cost reasons, particularly in the case of "piecemeal" scrap (i.e. small pieces of scrap, such as chips), the scrap is generally put away in bulk, with no distinction made between alloys. As a result, although, in principle, all aluminium-based scrap is recyclable, it is often downgraded, and therefore depreciated, and recycled as "run-of-the-mill" aluminium. However, in certain industries, such as the aeronautical industry, the intermediate metal products have a high intrinsic value mainly due to the actual composition of their specified alloy, such that the depreciation of scrap increases the production costs of finished products. Moreover, the composition of these alloys, which is often special, may not be compatible with their recycling in wrought alloys containing lower amounts of alloying elements, particularly in wrought alloys belonging to other families. This gives rise to technical and economical limitations during the smelting of these alloys when scrap of aeronautical alloys of the 7000 series is to be used.

The aeronautical industry uses a large number of aluminium alloys, essentially found in the 1000, 2000 and 7000 series of the Aluminium Association and the European standard EN 573-3. For example, in the 7000 series alone, this industry particularly uses 7010, 7040, 7050, 7075, 7150, 7175 and 7475 alloys. Under these conditions, it is difficult to envisage, for cost, organisation and stock management reasons, storing scrap made of these alloys separately. Therefore, machining scrap stocks are generally very heterogeneous and of a variable composition. In addition, even if it were planned to sort the different alloys contained in the scrap, it would be difficult to prevent any accidental pollution of scrap stocks made of a given alloy by scrap from other alloys of the same series or different series.

Moreover, the composition of alloys differs significantly, even within a given series of alloys, which generally makes it impossible to recycle machining scrap combined to manufacture products made of a specific loaded alloy. Thus, the industrial practice in processing plants consists of manufacturing such products only using alloys produced from relatively pure bases or low alloy products whose composition is corrected by adding specified alloy elements and/or using listed large pieces of scrap made of specific alloy having nominal composition from the plant's own production, such as plate stripping layers or rolling rejects. This industrial practice ensures great control of the specific loaded alloys, which particularly makes it possible to prevent random modifications of the composition of the products obtained.

This problem is of particular importance for 7000 series alloys intended for the aeronautical industry, particularly due to the large number of grades used. Firstly, the relatively complex composition of these alloys must be maintained within narrow ranges. Secondly, these alloys have very different zirconium and chromium contents, which are anti-recrystallising elements, the content of which must be observed in the final alloy.

Therefore, the applicant attempted to find a manufacturing process for intermediate products made of 7000 series alloys according to the Aluminium Association or CEN (EN 573-3) standard or any other specification, using scrap from products made of alloys in this series, which retains the advantages of the current industrial practice and is not a redhibitory burden for the manufacturing costs.

DESCRIPTION OF THE INVENTION

According to the invention, the manufacturing process of an intermediate product such as a rolling ingot, extrusion billet, forging block or ingot, made of a specified 7000 series alloy (according to the Aluminium Association, the European standard EN 573-3 or any other specification), with said specified alloy having a target content of at least one first anti-recrystallising element, is characterised in that it comprises:

- the supply of scrap comprising scrap made of at least one second 7000 series alloy having a target content of at least one second anti-recrystallising element greater than the maximum accepted content in said specified alloy;
- at least one refining step of said scrap to reduce the content of said second anti-recrystallising element to a value below the maximum accepted content in said specified alloy;
- the production of a batch of liquid metal having nominal composition, in part or in whole, from the purified metal obtained through the refining step;
- the formation of said intermediate product by casting said metal having nominal composition.

The word "scrap" encompasses aluminium or aluminium alloys materials resulting from the collection and/or recovery of metals arising at various stages of fabrication or of intermediate or finished products after use, to be used for the production of aluminium alloys. The term "new scrap" designates scrap arising from the production and fabrication of aluminium products while the scrap arising from products after use is termed "old scrap".

Within the scope of the present invention said scrap is typically constituted of new scrap arising from the fabrication of finished products by machining, working, cutting, etc. of said intermediate product. Said new scrap is most often essentially constituted of machining scrap (that is constituted of at least 90%, or even 95%, machining scrap), such as machining chips or turnings. Said new scrap may also comprise scrapped products, particularly discarded products such as damaged intermediate products (e.g. products damaged during production, handling or transportation). Said scrap may also include recovered and/or collected products arising from various stages of fabrication of the intermediate product and/or from its subsequent use, such as new or old scrap.

The invention is preferably applied when the first anti-recrystallising element is chromium (Cr) and the second anti-recrystallising element is zirconium (Zr). The invention is also applicable to the opposite case where the first anti-recrystallising element is zirconium and the second anti-recrystallising element is chromium.

The applicant observed that, contrary to expectations, it was possible to directly recycle batches essentially comprising scrap made of 7000 series alloys, but of a random average composition, within the scope of a relatively simple process, without producing deviations in the composition of the processed products, by means of the introduction of at least one refining step during the production of the metal having nominal composition. It was also surprised to note that it was possible to partially, and selectively, refine an alloy as loaded as a 7000 series alloy.

The process according to the invention does not require the classification of scrap by alloy; it is sufficient for the scrap to be all made of 7000 series alloys, even if the compositions of the alloys of this series differ significantly. This makes it possible to recycle scrap from different 7000 series alloys together.

In addition, the process makes it possible to recycle scrap from 7000 series alloys easily even if the average composition of the supplies varies considerably, which is normally the case since it depends on the respective quantities of different alloys used in the plant in intermediate products made and the fraction of intermediate products rejected in the form of scrap.

DETAILED DESCRIPTION OF THE INVENTION

Figure 1:
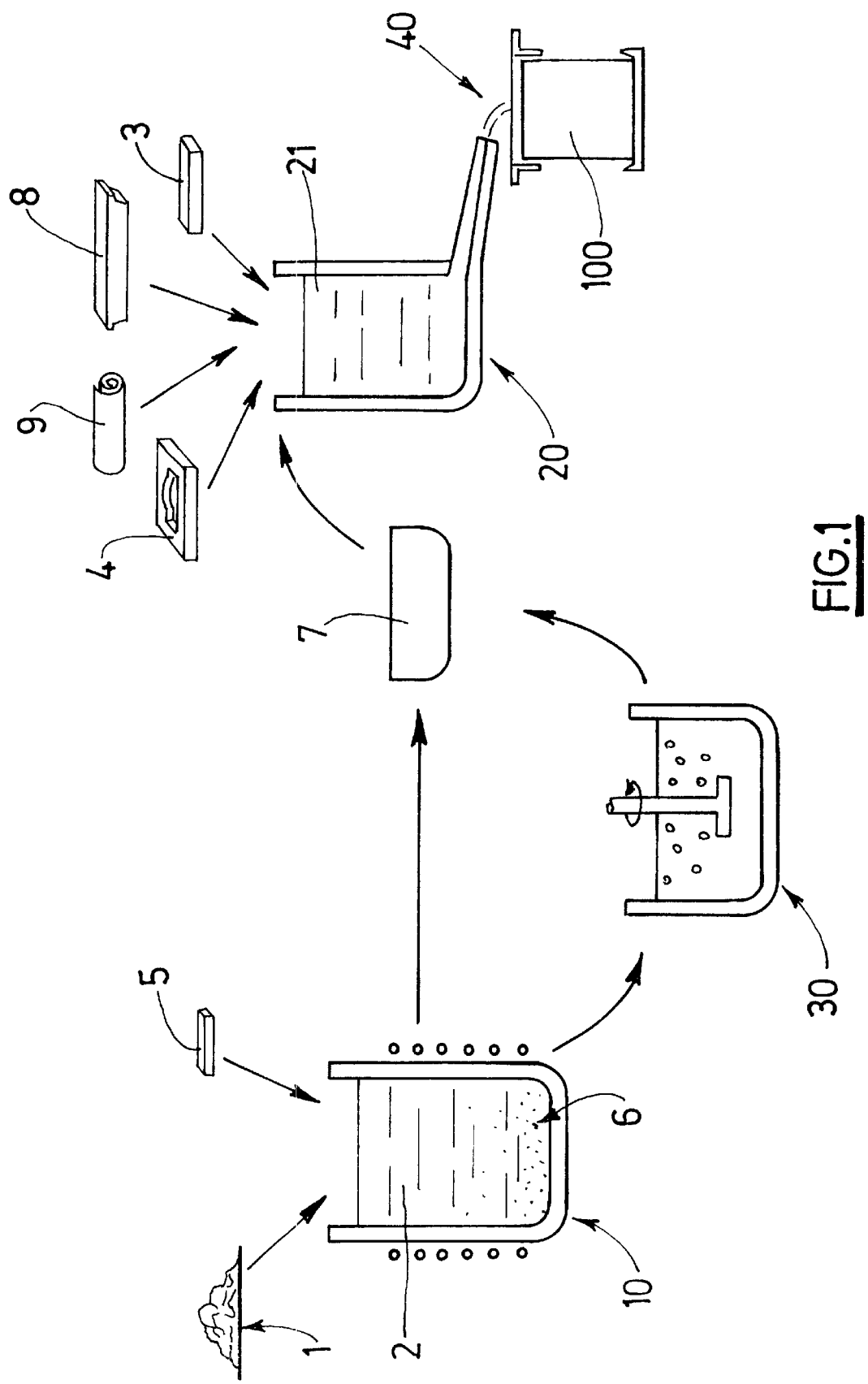
FIG. 1 illustrates a preferred embodiment of the process according to the invention.

According to the invention, the manufacturing process of an intermediate product (100) such as a rolling ingot, extrusion billet, forging block or ingot, made of a specified 7000 series alloy according to the Aluminium Association or the European standard EN 573-3 (or any other specification), hereafter referred to as "7000 series", with said specified alloy having a target content of at least one first anti-recrystallising element, referred to as "element Z1", selected from the group consisting of Zr and Cr, is characterised in that it comprises:

the supply of scrap (1), such as machining scrap, comprising scrap made of at least one second 7000 series alloy having a target content of at least one second anti-recrystallising element, referred to as "element Z2", selected from the group consisting of Zr and Cr, greater than the maximum accepted content in said specified alloy;

at least one refining step of said scrap (1) to reduce the content of said second anti-recrystallising element Z2 to a value below the maximum accepted content in said specified alloy;

the production of a batch of liquid metal having nominal composition (21), in part or in whole, from the purified metal (7) obtained through the refining step;

the formation of said intermediate product (100) by casting (40) said metal having nominal composition (21).

At the supply step, the scrap may be supplied in different forms, particularly in the form of bulk piecemeal (i.e. as recovered from machining stations or stocks) and/or in the form of products having undergone initial processing, such as compaction (e.g. to produce "bricks") or melting (e.g. to produce "boles", which is a large ingot with a unitary mass of the order of half a ton). This initial processing may make it possible to simplify the transport, handling and/or storage of the intermediate products, particularly scrap.

The invention particularly applies if the specified alloy is a 7075 or 7175 alloy, wherein the anti-crystallising element is chromium, in which case the second alloy may be a 7010, 7050, 7040, 7150, 7449 or 7055 alloy, wherein the anti-crystallising element is zirconium. Conversely, the specified alloy may be a 7010, 7050, 7040, 7055, 7449 or 7150 alloy and the second alloy may be a 7075, 7175, 7475 or 7349 alloy. The scrap may contain more than two alloys.

The invention is of particular interest when the composition of 10 to 90% of the scrap is that of said second alloy. Indeed, scrap containing less than 10% scrap with the composition of said second alloy often has an average element Z2 content less than the maximum permitted value for the specified alloy. On the other hand, when the composition of more than 90% of the scrap is that of said second alloy, it is preferable to use it for the production of a more similar specified alloy, i.e. for the production of an alloy with at least the same basic anti-recrystallising element.

In practice, aeronautical industry scrap may also contain a significant proportion of scrap made of alloys other than those of the 7000 series, typically 2000 series alloys such as 2024. Such scrap may also be used in the process according to the invention, provided that the proportion of "contaminating" alloys is relatively low, i.e. less than approximately 20%, and preferably less than 10%.

In practice, it is advantageous to perform a chemical analysis of the scrap (1) to determine the average composition and recycle it in a specified alloy of the closest possible composition. This step may consist of melting a batch of scrap beforehand and analysing the metal obtained, optionally after an intermediate solidification step used to produce boles (7) of identified composition. This analysis is of particular interest for producing alloys with a content of certain elements (such as Fe and Si) lower than that required by standards.

In a given batch of liquid metal having nominal composition (21), the proportion of metal obtained from recycled metal (1) (i.e. from scrap) is typically at least equal to 10% by weight. The remainder is obtained from other aluminium-based products (4, 8, 9) and alloy elements (3) added to correct the liquid metal (21) composition. The alloy elements (3) are generally added in the form of high-alloy aluminium alloys in a single element or containing these elements or in the form of added pure metals. The different forms used to add alloy elements are referred to as "MAAM" which stands for "master alloys and added metals".

Said aluminium-based products are typically, firstly, large recycled products (4) (such as cuttings) made of 7000 series alloy for which the composition is known and, secondly, products produced by the plant (9) made of 7000 series alloy for which the anti-recrystallising element Z1 content is preferably less than the target content and, finally, products (8) made of "new" aluminium (i.e. "pure" or low-alloy aluminium typically containing more than 99.8% aluminium), typically in the form of ingots, for which the anti-recrystallising element Z1 and Z2 content is preferably less than 100 ppm by weight. The proportion of added 7000 series alloy products (4, 9) is typically greater than 65% in order to guarantee, in practice, the continual recycling of the plant's internal scrap and reject production. The proportion of metal obtained from recycled metal is selected to ensure high stability of the composition of the metal having nominal composition (21) which could undergo slow deviations, difficult to reverse.

The scrap, and particularly machining scrap, may be essentially composed of piecemeal scrap, cutting scrap or other small pieces for which the size does not allow rigorous sorting and separation of compositions or alloys, i.e. for which it is normally difficult to ensure the traceability of the composition. A particular batch of scrap may be composed of a mixture of chips, cutting scrap and other small pieces. Large pieces are preferably removed from the scrap, analysed and recycled differently. In practice, the composition of large pieces is often known due to the improved traceability of these products, which makes their separate recycling possible. The present invention also enables treating scrap containing large pieces or consisting essentially of large pieces.

In a preferred method according to the invention, said at least one refining step comprises:

the melting of a batch of scrap (1) in a first melting furnace (10), to obtain a first remelting liquid metal mass, referred to as the unprocessed liquid metal (2), which is preferably more or less homogeneous;

the precipitation of at least one of the anti-recrystallising elements using a selective precipitating agent (5) comprising boron, to reduce the average content of this element in said unprocessed liquid metal (2) to a value less than or equal to a specified limit;

the separation of the unprocessed liquid metal (2) and the precipitation products (or "precipitates") (6), to obtain a purified metal (7) with a precipitated element content less than or equal to the specified limit.

The applicant observed that the precipitation kinetics of the anti-recrystallising elements, which, surprisingly, corresponds to only a few tens of minutes (rather than a few hours), is in fact compatible with the melting cycle of a processing plant.

Said selective precipitating agent (5) is preferably a boron master alloy, such as AB4, or a compacted aluminium and boron powder, or a salt of boron such as potassium fluoroborate. Typically, when said precipitating agent is a master alloy, this agent is introduced in the liquid mass in the form of slices. When the element Z2 is Zr, the equivalent quantity Q of boron added is preferably between 0.25 and 1.0 times the Zr content, expressed in ppm by weight, of said unprocessed liquid metal (2). When the element Z2 is Cr, the equivalent quantity Q of boron added is preferably equal to the sum of a first quantity Q1 and a second quantity Q2 (i.e. Q=Q1+Q2), said quantity Q1 being between 0,25 and 1,0 times the Zr content of said unprocessed liquid metal (2) and said quantity Q2 being between 0,45 and 1,8 times the Cr content of said unprocessed liquid metal (2), said contents being expressed in ppm per weight. In the latter case, an additional quantity of boron (Q1) is necessary in order to take into account the fact that the affinity of boron for Zr is greater than that for Cr, so that boron reacts with Zr before reacting with Cr (i.e. the reaction produces $ZrB_2$ precipitates before producing $CrB_2$ precipitates)

The first melting furnace (10) is advantageously an induction furnace, which enables an effective and fast dissolution of the precipitating agent (5) due to the electromagnetic stirring of the liquid metal mass induced by the furnace. In another embodiment of the invention, the first melting furnace may be a side well reverbetory furnace, which normally has recirculating immersion means for scraps. The induction furnace and the side well reverbetory furnace are advantageous because they have a low ignition losses. However, the present invention is not limited to the use of a particular furnace.

The value of said specified limit is preferably less than or equal to the maximum content of the second anti-recrystallising element Z2 in said specified alloy. Such a choice makes it possible to limit considerably, or even prevent, the addition of pure or low-alloy aluminium (or "new" aluminium) during the correction of the liquid metal (21) composition.

The temperature of said unprocessed liquid metal (2) during the selective precipitation operation is preferably greater than 700° C., to favour the dissolution of the selective precipitating agent (5).

The metal (2) and the precipitates (6) are separated by decanting at a temperature preferably less than 700° C. and greater than 660° C. to favour the growth of the precipitates, to select the precipitation and limit the increase in viscosity, in which case the viscosity of the liquid mass is reduced and the decanting process quicker.

In an improved variant of this embodiment, the process also comprises a gas treatment (30) of the purified metal (7) to eliminate inclusions. In this case, it is advantageous to perform the decanting in the gas treatment ladle, which makes it possible to compensate up for the process standby time, i.e. the ladle can be used as a buffer tank. The gas (30) preferably comprises chlorine, particularly to favour the coalescence of the $ZrB_2$ and/or $CrB_2$ nuclei and their elimination. Typically, the proportion of chlorine is equal to approximately 7%, with the remainder typically composed of nitrogen or argon.

Said purified metal (7) may be cast in the form of boles or ingots before being used in the production of said liquid metal having nominal composition (21).

Figure 2:
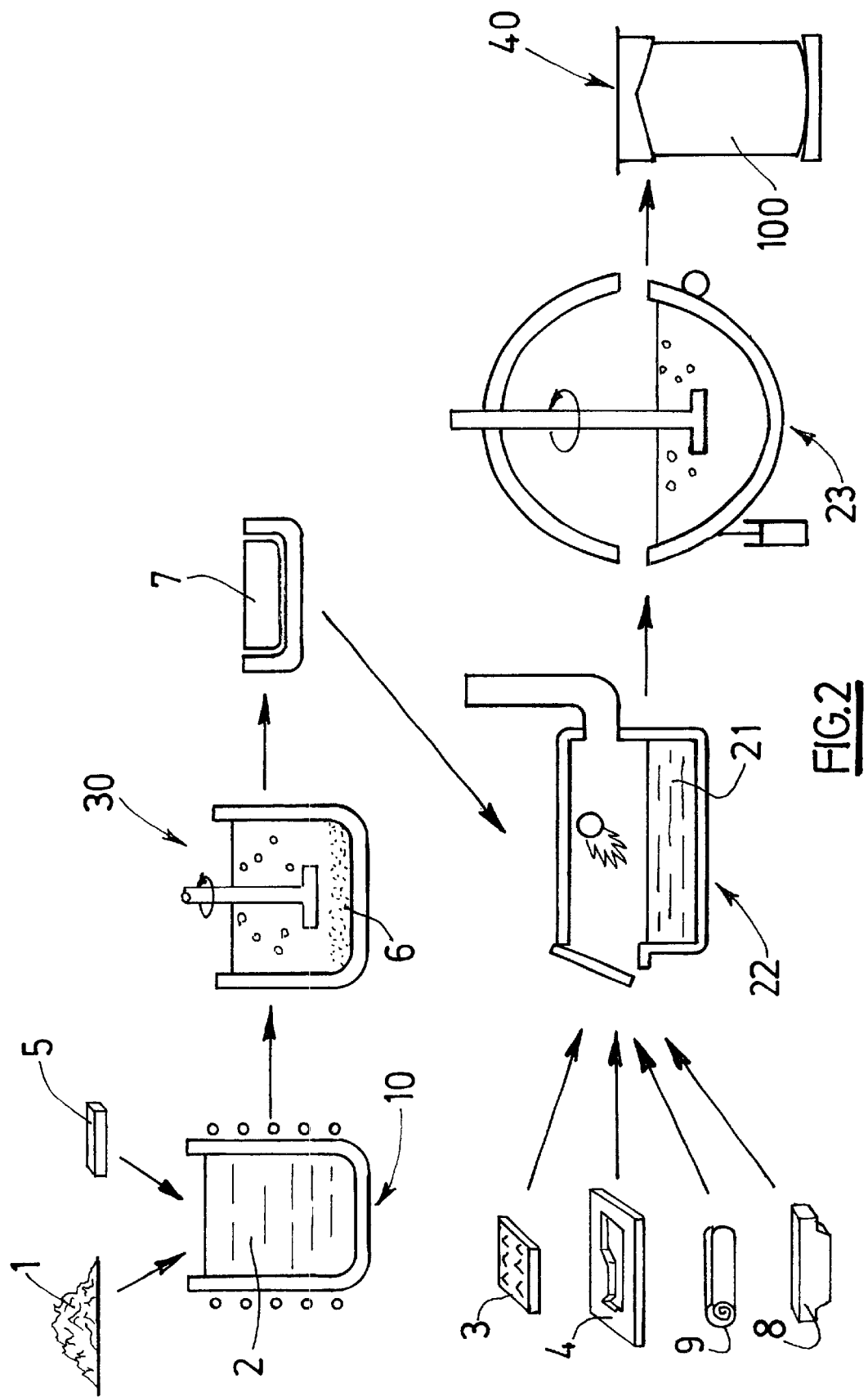
FIG. 2 illustrates a variant of this embodiment.

In practice, as illustrated in FIG. 2, the correction of the liquid metal (21) composition is preferably performed in a second melting furnace (22) and the casting of the product (100) is performed using a holding furnace (23).

According to an advantageous variant of the preferred embodiment according to the invention, illustrated in FIG. 2, the production of the liquid metal having nominal composition (21) also comprises a degassing operation on the metal having nominal composition before casting, which is preferably performed in the holding furnace (23).

EXAMPLES

Intermediate product manufacturing tests using machining scraps from aeronautical aluminium alloy products were performed. From a delivery of two trucks of bulk machining scrap, of a total net weight of 52,740 kg, a sample of 23 tonnes was removed and processed according to the invention. The scrap, essentially chips, came in the form of bundles of bricks (with each brick having approximate dimensions of 22 cm×22 cm×30 cm and an approximate average unit weight of 18 kg). The scrap was relatively coarse and hardly oily. The scrap was melted in an induction oven and processed with AB4 by introducing 2 AB4 slices (or 12 kg) per tonne inserted in the furnace. The temperature at the end of melting was 740° C. to obtain a temperature of approximately 700° C. in the ladle during the start of the precipitation and decanting phase. After a decanting time of approximately 40 minutes, a liquid metal sample was removed near the surface and analysed, to check that the Zr content was less than 100 ppm. A comparable value was observed in the boles cast using this metal when the decanting time was greater than approximately 8 hours. The chromium and titanium contained in the unprocessed metal were also consumed by reaction with the boron and also reached contents close to 100 ppm. It was observed that the AB4 dissolution yield was excellent in the induction furnace.

A batch of 26 boles (7) of an average unit weight of 900 kg was produced using this sample, by casting in a mould.

The composition of these boles was determined by chemical analysis. On average, it was as follows (in % by weight): Si=0.07; Fe=0.12; Cu=1.85; Mn=0.06; Mg=2.00; Cr=0.10; Zn=5.10; Ti=0.03; Zr=0.06. The composition of boles from different casts varied by 10% at most around these values. Such a composition made it possible to estimate that the scrap sample was composed of at least 3 alloys in the following proportions: 48±7% of 7010, 45±7% of 7X75 (where it was not possible to determine whether X was equal to 0, 1 or 4) and 7±1% of 2024. The quantity of manganese introduced by the presence of 2024 alloy did not affect the recycling of this scrap into a 7000 series alloy. In this case, part of the sample was used to produce a 7075 product, according to the preferred embodiment of the process according to the invention.

The boles prepared in this way were used to produce 125.7 tonnes of 7175 composition metal intended for the manufacture of strong sheets. The metal having nominal composition comprised on average 18.5% recycled metal boles and 57.1% production cutting scrap, with the remainder composed of added aluminium elements and new aluminium (8).

The metal having nominal composition was transferred into a casting furnace. Three castings of 8 plates (370× 1450×3700 mm) were cast using this metal.

The applicant did not measure abnormal quantities of inclusions with boron. It attributes this result to the fact that the refining of the recycled metal is carried out upstream from the actual metal production phase.

BENEFITS OF THE INVENTION

The process according to the invention offers the advantage of enabling the manufacture of an intermediate alloy made of any specified 7000 series alloy using any composition of scrap obtained from the processing of products made of different 7000 series alloys, and containing, if applicable, a small quantity of alloys of another series, such as the 2000 series. In other words, the process according to the invention makes it possible to recycle scrap wherein the average chromium and zirconium content may vary considerably between batches (possibly up to a factor of ten in the most extreme cases) due to the significant differences in anti-recrystallising element contents in 7000 series alloys.

The process according to the invention also offers the advantage of not requiring a considerable supply of metal other than that obtained from the scrap itself, such as a basic metal with a similar composition or a pure or low-alloy aluminium-based metal, having a dilution effect. Indeed, such a supply of additional metal increases manufacturing costs and limits the recycling capacity of industrial processes.

What is claimed is:

1. Manufacturing process for an intermediate product made of a predetermined 7000 series alloy having a target content of at least one first anti-recrystallizing element Z1 selected from the group consisting of Zr and Cr, comprising the steps of:
   a) supplying scrap comprising at least one second 7000 series alloy having a target content of at least one second anti-recrystallizing element Z2 selected from the group consisting of Zr and Cr, in an amount greater than a maximum accepted content of Z2 in said predetermined alloy;
   b) conducting at least one refining step of said scrap to reduce the amount of Z2 to a value below the maximum accepted content of Z2 in said predetermined alloy;
   c) producing a batch of liquid metal having nominal composition, in part or in whole, from the refined scrap; and
   d) forming said product by casting said liquid metal.

2. Process according to claim 1, wherein Z1 is chromium and Z2 is zirconium.

3. Process according to claim 2, wherein the predetermined alloy is selected from the group consisting of 7075 and 7175 alloys, and the second alloy is selected from the group consisting of 7010, 7050, 7040, 7150, 7449 and 7055 alloys.

4. Process according to claim 1, wherein said Z1 is zirconium and Z2 is chromium.

5. Process according to claim 4, wherein the predetermined alloy is selected from the group consisting of 7010, 7050, 7040, 7449, 7055 and 7150 alloys, and the second alloy is selected from the group consisting of 7075, 7175, 7475 and 7349 alloys.

6. Process according to claim 1, wherein the composition of 10 to 90% by weight of the scrap is that of said second alloy.

7. Process according to claim 1, wherein, in a given batch of liquid metal having nominal composition, at least 10% by weight of metal is obtained from scrap.

8. Process according to claim 1, wherein the production of the metal having nominal composition comprises the introduction of aluminum-based products selected from the group consisting of new aluminum products, master alloys and added metals (MAAM) and 7000 series alloy products.

9. Process according to claim 1, wherein the production of the metal having nominal composition comprises introducing a 7000 series alloy product at a rate of over 65% by weight.

10. Process according to claim 1, wherein said at least one refining step comprises:
    melting a batch of scrap in a first melting furnace, to obtain a first remelting liquid metal mass;
    precipitating at least one of the anti-recrystallizing elements using a selective precipitating agent comprising boron, to reduce the average content of the at least one element in said first remelting liquid metal mass to a value less than or equal to a predetermined limit; and
    separating the first remelting liquid metal mass and the precipitation products, to obtain a purified metal with a precipitated element content less than or equal to the predetermined limit.

11. Process according to claim 10, wherein said first melting furnace is an induction furnace.

12. Process according to claim 10, wherein said first melting furnace is a side well reverbetory furnace.

13. Process according to claim 10, wherein said selective precipitating agent is a boron-based master alloy.

14. Process according to claim 13, wherein the boron-based master alloy is AB4.

15. Process according to claim 10, wherein Z2 is Zr and boron is added in an amount, expressed in ppm by weight, of between 0.25 and 1.0 times the Zr content expressed in ppm by weight, in said first remelting liquid metal mass.

16. Process according to claim 10, wherein Z2 is Cr, and an equivalent quantity Q of boron added is equal to a sum, in ppm by weight, Q1+Q2, wherein Q1 is 0.25 to 1.0 times Zr content in said first remelting liquid mass, and Q2 is 0.45 to 1.8 times Cr content in said first remelting liquid metal mass.

17. Process according to claim 10, wherein said limit is less than or equal to the maximum content of Z2 in said predetermined alloy.

18. Process according to claim 10, wherein said first remelting liquid metal mass during the selective precipitation has a temperature of greater than 700° C.

19. Process according to claim 10, wherein the liquid metal and the precipitation products are separated by decanting at a temperature of between 660° C. and 700° C.

20. Process according to claim 10, further comprising a gas treatment of the purified metal to eliminate inclusions.

21. Process according to claim 20, wherein the purified metal is treated with a gas comprising chlorine.

22. Process according to claim 1, wherein the refining step comprises melting the scrap in a first melting furnace, and the producing step comprises correcting its composition in a second melting furnace, the casting of the product being performed using a holding furnace.

23. Process according to claim 1, wherein the producing step includes a degassing of the batch of liquid metal having nominal composition before casting.

24. Process according to claim 1, wherein the scrap comprises new scrap.

25. Process according to claim 1, wherein the scrap comprises machining scrap.

26. Process according to claim 1, wherein the scrap comprises recovered or collected products arising from fabrication or subsequent use of the intermediate products.

27. Process according to claim 1, wherein the scrap is supplied in the form of bulk piecemeal, or in the form of a product having undergone at least one first processing operation, or both.

28. Process according to claim 27, wherein the product which has undergone at least one processing operation has been treated by compaction or melting.

29. Process according to claim 1, wherein the product is an ingot, rolling ingot, extrusion billet or forging block.

30. Manufacturing process for an intermediate product made of a predetermined 7000 series alloy selected from the group consisting of 7010, 7050, 7040, 7449, 7055 and 7150 alloys having a target content of a first anti-recrystallizing element Z1 which is Zr, comprising the steps of:
 a) supplying machining scrap comprising at least one second 7000 series alloy selected from the group consisting of 7075, 7175, 7475 and 7349 alloys having a target content of at least one second anti-recrystallizing element Z2 which is Cr, in an amount greater than a maximum accepted content of Z2 in said predetermined alloy;
 b) conducting at least one refining step of said scrap to reduce the amount of Z2 to a value below the maximum accepted content of Z2 in said predetermined alloy;
 c) producing a batch of liquid metal having nominal composition, in part or in whole, from the refined scrap; and
 d) forming said product by casting said liquid metal.

31. Manufacturing process for an intermediate product made of a predetermined 7000 series alloy having a target content of at least one first anti-recrystallizing element Z1 selected from the group consisting of Zr and Cr, comprising the steps of:
 a) supplying machining scrap comprising at least one second 7000 series alloy having a target content of at least one second anti-recrystallizing element Z2 selected from the group consisting of Zr and Cr, in an amount greater than a maximum accepted content of Z2 in said predetermined alloy;
 b) conducting at least one refining step of said scrap to reduce the amount of Z2 to a value below the maximum accepted content of Z2 in said predetermined alloy, said at least one refining step comprising:
  melting a batch of machining scrap in a first melting furnace which is a side well reverbetory furnace, to obtain a first remelting liquid metal mass;
  precipitating at least one of the anti-recrystallizing elements using a selective precipitating agent comprising boron, to reduce the average content of the at least one element in said first remelting liquid metal mass to a value less than or equal to a predetermined limit; and
  separating the first remelting liquid metal mass and the precipitation products, to obtain a purified metal with a precipitated element content less than or equal to the predetermined limit;
 c) producing a batch of liquid metal having nominal composition, in part or in whole, from the refined scrap; and
 d) forming said product by casting said liquid metal.

32. Manufacturing process for an intermediate product made of a predetermined 7000 series alloy having a target content of at least one first anti-recrystallizing element Z1 selected from the group consisting of Zr and Cr, comprising the steps of:
 a) supplying machining scrap comprising at least one second 7000 series alloy having a target content of at least one second anti-recrystallizing element Z2 which is Zr, in an amount greater than a maximum accepted content of Z2 in said predetermined alloy;
 b) conducting at least one refining step of said scrap to reduce the amount of Z2 to a value below the maximum accepted content of Z2 in said predetermined alloy, said at least one refining step comprising:
  melting a batch of machining scrap in a first melting furnace, to obtain a first remelting liquid metal mass;
  precipitating at least one of the anti-recrystallizing elements using a selective precipitating agent comprising boron, to reduce the average content of the at least one element in said first remelting liquid metal mass to a value less than or equal to a predetermined limit; and
  separating the first remelting liquid metal mass and the precipitation products, to obtain a purified metal with a precipitated element content less than or equal to the predetermined limit;
 c) producing a batch of liquid metal having nominal composition, in part or in whole, from the refined scrap; and
 d) forming said product by casting said liquid metal,
 wherein boron is added in an amount, expressed in ppm by weight, of between 0.25 and 1.0 times the Zr content expressed in ppm by weight, in said first remelting liquid metal mass.

33. Manufacturing process for an intermediate product made of a predetermined 7000 series alloy having a target content of at least one first anti-recrystallizing element Z1 selected from the group consisting of Zr and Cr, comprising the steps of:

a) supplying machining scrap comprising at least one second 7000 series alloy having a target content of at least one second anti-recrystallizing element Z2 which is Cr, in an amount greater than a maximum accepted content of Z2 in said predetermined alloy;

b) conducting at least one refining step of said scrap to reduce the amount of Z2 to a value below the maximum accepted content of Z2 in said predetermined alloy, said at least one refining step comprising:
   melting a batch of machining scrap in a first melting furnace, to obtain a first remelting liquid metal mass;
   precipitating at least one of the anti-recrystallizing elements using a selective precipitating agent comprising boron, to reduce the average content of the at least one element in said first remelting liquid metal mass to a value less than or equal to a predetermined limit; and
   separating the first remelting liquid metal mass and the precipitation products, to obtain a purified metal with a precipitated element content less than or equal to the predetermined limit;

c) producing a batch of liquid metal having nominal composition, in part or in whole, from the refined scrap; and d) forming said product by casting said liquid metal, wherein an equivalent quantity Q of boron added is equal to a sum, in ppm by weight, Q1+Q2, wherein Q1 is 0.25 to 1.0 times Zr content in said first remelting liquid mass, and Q2 is 0.45 to 1.8 times Cr content in said first remelting liquid metal mass.

34. Manufacturing process for an intermediate product made of a predetermined 7000 series alloy having a target content of at least one first anti-recrystallizing element Z1 selected from the group consisting of Zr and Cr, comprising the steps of:

a) supplying machining scrap comprising at least one second 7000 series alloy having a target content of at least one second anti-recrystallizing element Z2 selected from the group consisting of Zr and Cr, in an amount greater than a maximum accepted content of Z2 in said predetermined alloy;

b) conducting at least one refining step of said scrap to reduce the amount of Z2 to a value below the maximum accepted content of Z2 in said predetermined alloy;

c) producing a batch of liquid metal having nominal composition, in part or in whole, from the refined scrap; and d) forming said product by casting said liquid metal, wherein the scrap is supplied in the form of bulk piecemeal, or in the form of a product having undergone at least one first processing operation, or both.

* * * * *